United States Patent
Rizq

(10) Patent No.: US 11,549,051 B2
(45) Date of Patent: Jan. 10, 2023

(54) METHODS AND COMPOSITIONS FOR CONSOLIDATING SAND IN SUBSURFACE FORMATIONS

(71) Applicant: Saudi Arabian Oil Company, Dhahran (SA)

(72) Inventor: Ahmad Noor Al-deen Rizq, Doha (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/474,425

(22) Filed: Sep. 14, 2021

(65) Prior Publication Data

US 2022/0127515 A1 Apr. 28, 2022

Related U.S. Application Data

(60) Provisional application No. 63/094,948, filed on Oct. 22, 2020.

(51) Int. Cl.
*C09K 8/575* (2006.01)
*C09K 8/57* (2006.01)
*C09K 8/40* (2006.01)

(52) U.S. Cl.
CPC .............. *C09K 8/575* (2013.01); *C09K 8/40* (2013.01); *C09K 8/572* (2013.01)

(58) Field of Classification Search
CPC . C09K 8/40; C09K 8/56; C09K 8/565; C09K 8/575
See application file for complete search history.

(56) References Cited

U.S. PATENT DOCUMENTS

| | | |
|---|---|---|
| 2,223,789 A | 12/1940 | Limburg |
| 2,356,205 A | 8/1944 | Blair, Jr. et al. |
| 2,770,306 A | 11/1956 | Clark |
| 2,854,396 A | 9/1958 | Hunt et al. |
| 2,970,958 A | 2/1961 | Shapiro |
| 3,032,499 A | 5/1962 | Brown |
| 3,251,414 A | 5/1966 | Willman |
| 3,402,770 A | 9/1968 | Messenger |
| 3,804,744 A | 4/1974 | Fera |
| 3,910,351 A | 10/1975 | Wu et al. |
| 4,494,605 A | 1/1985 | Wiechel et al. |
| 4,501,328 A | 2/1985 | Nichols |
| 4,895,207 A | 1/1990 | Friedman et al. |
| 6,186,232 B1 | 2/2001 | Isaacs et al. |
| 6,367,458 B1 | 4/2002 | Furusho et al. |
| 9,074,125 B1 | 7/2015 | Lahalih |
| 9,322,260 B2 | 4/2016 | Patapenko et al. |
| 9,672,384 B2 | 6/2017 | Goto et al. |
| 10,655,053 B2 | 5/2020 | Rizq et al. |
| 10,907,087 B2 | 2/2021 | Rizq et al. |
| 11,021,647 B2 | 6/2021 | Rizq et al. |
| 2011/0066441 A1 | 3/2011 | Ovalles et al. |
| 2012/0255886 A1 | 10/2012 | Flores Oropeza et al. |
| 2014/0000886 A1 | 1/2014 | Milam et al. |
| 2014/0318793 A1 | 10/2014 | van Petergem et al. |
| 2016/0145487 A1 | 5/2016 | Alam et al. |
| 2016/0200963 A1 | 7/2016 | Reed et al. |
| 2017/0166798 A1 | 6/2017 | Okamoto et al. |
| 2018/0273829 A1* | 9/2018 | Al-Nakhli ............. E21B 36/008 |
| 2019/0093451 A1 | 3/2019 | Al-Nakhli et al. |
| 2019/0249074 A1* | 8/2019 | Rizq ..................... C09K 8/506 |
| 2019/0264090 A1 | 8/2019 | Rizq et al. |

FOREIGN PATENT DOCUMENTS

| | | |
|---|---|---|
| CA | 2250648 C | 10/1998 |
| CA | 2594626 A1 | 1/2009 |
| CA | 2856460 A1 | 1/2016 |
| WO | 2005094552 A2 | 10/2005 |
| WO | 2014172711 A1 | 10/2014 |

OTHER PUBLICATIONS

Office Action dated Nov. 12, 2019 pertaining to U.S. Appl. No. 15/897,474, filed Feb. 15, 2018, 16 pgs.
Office Action dated Nov. 12, 2019 pertaining to U.S. Appl. No. 16/406,203, filed May 8, 2019, 24 pgs.
U.S. Office Action dated Jul. 29, 2020 pertaining to U.S. Appl. No. 16/915,263, filed Jun. 29, 2020, 7 pgs.
International Search Report and Written Opinion dated Jun. 3, 2019 pertaining to International application No. PCT/US2019/016834 filed Feb. 6, 2019, 14 pgs.
U.S. Office Action dated Jun. 27, 2019 pertaining to U.S. Appl. No. 15/897,474, filed Feb. 15, 2018, 28 pgs.

(Continued)

*Primary Examiner* — Aiqun Li
(74) *Attorney, Agent, or Firm* — Dinsmore & Shohl LLP

(57) ABSTRACT

A method for consolidating sand in a subsurface formation includes introducing a consolidation composition into the subsurface formation. The consolidation composition includes asphaltene and maltene dissolved in a solvent. After introducing the consolidation composition, the method further includes introducing an aqueous composition to the subsurface formation in order to precipitate the asphaltene in the subsurface formation. The precipitated asphaltene consolidates sand within the subsurface formation and the maltene forms channels throughout the subsurface formation, thereby increasing the permeability of the subsurface formation.

18 Claims, No Drawings

(56) References Cited

OTHER PUBLICATIONS

U.S. Office Action dated Jun. 28, 2019 pertaining to U.S. Appl. No. 16/406,203, filed May 8, 2019, 18 pgs.
Oilfield Review, "Asphaltenes—Problematic but Rich in Potential", Summer 2007.
Muggeridge et al., "Recovery rates, enhanced oil recovery and technological limits", Royal Society Publishing, Phil. Trans. R. Soc. A 372, Mar. 20, 2012.
Examination Report pertaining to Appl. No. GC2019-37041 dated May 20, 2020.
Notice of Allowance dated Sep. 23, 2020 pertaining to U.S. Appl. No. 15/897,474, filed Feb. 15, 2018, 5 pgs.
Notice of Allowance dated Jan. 23, 2020 pertaining to U.S. Appl. No. 16/406,203 filed, May 8, 2019, 7 pgs.
Notice of Allowance dated Feb. 1, 2021 pertaining to U.S. Appl. No. 16/915,263, filed Jun. 29, 2020, 5 pgs.
Corrected Notice of Allowance dated Feb. 24, 2021 pertaining to U.S. Appl. No. 16/915,263, filed Jun. 29, 2020, 3 pgs.

\* cited by examiner

METHODS AND COMPOSITIONS FOR CONSOLIDATING SAND IN SUBSURFACE FORMATIONS

CROSS-REFERENCE TO RELATED APPLICATIONS

This application claims the benefit of U.S. Provisional Application Ser. No. 63/094,948, filed Oct. 22, 2020, the entire disclosure of which is hereby incorporated herein by reference.

TECHNICAL FIELD

The present disclosure relates to natural resource well drilling and hydrocarbon production and, more specifically, to methods and compositions for consolidating sand in subsurface formations.

BACKGROUND

The discovery and extraction of hydrocarbons, such as oil or natural gas, from subsurface formations, may be impeded for a variety of reasons, such as inherently poor permeability or damage to the formation. The production rate of hydrocarbons from a hydrocarbon-producing region of the formation may be reduced due to increased sand production from unconsolidated formations. In these instances, methods for consolidating the sand in the formation can be utilized to improve hydrocarbon production. Sand consolidation methods may include chemical injections, such as the injection of plastic resins that attached to the formation sand grains. The resin subsequently hardens and forms a consolidated mass, binding the sand grains together at their contact points.

SUMMARY

The primary difficulty in using chemical sand consolidation systems is attaining complete and even placement of the chemicals in the subsurface formation and a permeability of the consolidated sand sufficient for hydrocarbon production from the subsurface formation. Therefore, a continuing need exists for methods and compositions for chemical sand consolidation systems with a reduced viscosity (i.e. less than 15 centiPoise (cP)) such that the chemicals may penetrate the formation completely and still provide a permeability sufficient for production from the consolidated sand. The present disclosure is directed to compositions and methods for sand consolidation that meet this need.

In accordance with one or more embodiments of the present disclosure, a method for consolidating sand in a subsurface formation includes introducing a consolidation composition into the subsurface formation, the consolidation composition comprising asphaltene and maltene dissolved in a solvent; and after introducing the consolidation composition, introducing an aqueous composition to the subsurface formation in order to precipitate the asphaltene in the subsurface formation, where the precipitated asphaltene consolidates sand within the subsurface formation and the maltene forms channels throughout the subsurface formation, thereby increasing the permeability of the subsurface formation.

Additional features and advantages of the described embodiments will be set forth in the detailed description which follows. The additional features and advantages of the described embodiments will be, in part, readily apparent to those skilled in the art from that description or recognized by practicing the described embodiments, including the detailed description which follows as well as the drawings and the claims.

DETAILED DESCRIPTION

Recitations in the present disclosure of "at least one" component, element, constituent, compound, or other feature, should not be used to create an inference that the alternative use of the articles "a" or "an" should be limited to a single component, element, constituent, compound, or feature. For example, "an alkyl alcohol" may refer to one alkyl alcohol or more than one alkyl alcohol.

A formation is the fundamental unit of lithostratigraphy. As used in the present disclosure, the term "formation" refers to a body of rock that is sufficiently distinctive and continuous from the surrounding rock bodies that the body of rock can be mapped as a distinct entity. A formation is, therefore, sufficiently homogenous to form a single identifiable unit containing similar rheological properties throughout the formation, including, but not limited to, porosity and permeability. A single formation may include different regions, where some regions include hydrocarbons and others do not. To produce hydrocarbons from the hydrocarbon regions of the formation, production wells are drilled to a depth that enables these hydrocarbons to travel from the subsurface formation to the surface.

As used throughout this disclosure, the term "back pressure" refers to the pressure caused by fluid friction or an induced resistance to flow through the system.

As used throughout this disclosure, the term "sand consolidation" refers to a means of controlling the undesirable production of sand from weak sandstone formations. In weak formations, sand consolidation may be necessary to maintain the structure of the reservoir around the wellbore and the migration of sand and fines into the near wellbore area may severely restrict production. Sand consolidation chemically binds the grains of sand that make up the formation matrix while maintaining sufficient permeability to achieve viable production rates, such as from 2000 to 5000 barrels per day (BPD).

The present disclosure is directed to methods for consolidating sand in a subsurface formation, in particular to methods for consolidating sand in a subsurface formation. The methods include introducing a consolidation composition into the subsurface formation. The consolidation composition includes asphaltene and maltene dissolved in a solvent. After introducing the consolidation composition, the method further includes, introducing an aqueous composition to the subsurface formation in order to precipitate the asphaltene in the subsurface formation. The precipitated asphaltene then consolidates the sand present in the subsurface formation and the maltene, which is still in liquid form, forms channels throughout the subsurface formation, thereby increasing the permeability of the subsurface formation. As described subsequently in this disclosure, the asphaltene is less soluble in the aqueous composition compared to solubility in the solvent, which causes the asphaltene to precipitate out of the liquid to form a solid precipitate within the formation. The precipitated asphaltene then consolidates the sand within the subsurface formation. In contrast, the maltene is soluble in both the solvent and the aqueous composition, and therefore does not precipitate when the aqueous composition is introduced into the subsurface formation.

Among other benefits, the consolidation composition does not have a limited time frame for use. The consolidation composition does not have a set time or cure time limiting the time available to pump the consolidation composition into the subsurface formation, which may enable the consolidation composition to be pumped longer and therefore travel farther into the subsurface formation. Furthermore, the asphaltene precipitates out of solution when the aqueous composition is introduced into the subsurface formation and remains in place afterwards, consolidating the sand. Therefore, time is not a limiting factor, and the asphaltene will function as sand consolidator for as long as necessary. The consolidation composition also has a lesser viscosity (at most 15 centiPoise (cP)) than conventional diversion materials (having a viscosity of greater than 15 cP), which enables the asphaltene to travel a farther distance into the formation during injection compared to the conventional consolidation materials.

Asphaltene may be a material recovered as a by-product of hydrocarbon processing. For example, the asphaltene may precipitate out of the hydrocarbon streams as the result of pressure drop, turbulent flow, solution carbon dioxide, injected condensate, mixing of incompatible crude oils, or other conditions or materials that break the stability of the asphaltene in the hydrocarbon stream during hydrocarbon processing. Utilizing asphaltene in the present method may provide a beneficial use for a by-product recovered from hydrocarbon processing, which may result in recycling and conserving valuable resources. Asphaltene is a readily available material in hydrocarbon processing. Therefore, utilizing the asphaltene for sand consolidation may reduce costs as compared to conventional sand consolidation methods. Other benefits may be realized by the methods and compositions described in this disclosure.

As previously discussed in this disclosure, the consolidation composition includes asphaltene and maltene dissolved in a solvent. Maltenes are the n-alkane (pentane or heptane)-soluble molecular components of asphalt, which is the residue remaining after crude oil upgrading. Maltenes are viscous liquids that include heavy, dark-colored asphaltic resins, first acidaffins, second acidaffins, and saturates combined with lighter colored oils. First acidaffins may include aromatic hydrocarbons, with or without oxygen, nitrogen and sulfur. Second acidaffins may include straight chain or cyclic unsaturated petro-hydrocarbons (such as olefins). Saturates may include paraffins that are either straight or branch chain saturated hydrocarbons. Maltenes are characterized by a relatively lower molecular weight and greater solubility, as compared to asphaltenes. Maltenes may have a molecular weight of from 2000 to 4000 Daltons.

Asphaltene is an organic material that includes aromatic and naphthenic ring compounds and may contain nitrogen, sulfur, and oxygen compounds or functional groups. The asphaltene fraction of crude oil is not soluble in straight-chain hydrocarbon solvents such as pentane or heptane. Asphaltenes are present in carbonaceous materials such as crude oil and may be recovered from hydrocarbon processing operations as a byproduct or removed from the crude oil or intermediate hydrocarbon streams upstream of hydrocarbon processing operations.

Asphaltene includes the portion of a carbonaceous material that is not soluble in n-heptane but is soluble in toluene. Asphaltenes may be present in other carbonaceous materials, such as coal or bitumen, for example. Asphaltenes may include carbon, hydrogen, nitrogen, oxygen, and sulfur, as well as trace amounts of vanadium and nickel. In some embodiments, the asphaltenes may have a molar ratio of carbon to hydrogen of from 1:1 to 1:1.4, such as from 1:1.1 to 1:1.3, depending on the asphaltene source. In some embodiments, the asphaltenes may have a molecular mass of from 400 daltons (u) to 1500 u.

Asphaltene can be operationally defined as hydrocarbon compounds that are insoluble in n-heptane and soluble in toluene, as opposed to maltenes, which are soluble in both n-heptane and toluene. Asphaltene is non-soluble in water and other aqueous compositions and will remain in solid form when combined with water and other aqueous compositions. The non-solubility of asphaltene in water or other aqueous compositions means that even at increased temperature, the amount of asphaltene dissolved in the water or other aqueous composition is less than 0.01 weight percent (wt. %). However, asphaltenes are soluble in light aromatic solvents such as benzene and toluene and other light organic solvents, such as organic alcohols and halogenated hydrocarbons, for example. As previously discussed in this disclosure, the consolidation composition includes asphaltene dissolved in a solvent. The dissolved asphaltene may be precipitated out of the solvent solution by introducing an aqueous solution to the consolidation composition. As the aqueous solution gradually dilutes the solvent, the solubility of the asphaltene in the solvent is reduced, which causes precipitation of the asphaltene out of solution to form a solid precipitate. It was found that the difference in solubility of the asphaltene in the solvent compared to the solubility of asphaltene in water can be used to consolidate sand. For example, the greater solubility of the asphaltene in the solvent may enable the consolidation composition to be injected deep into the formation, even if the formation includes small pore sizes. Then, once the consolidation composition is in position in the formation, water or other aqueous composition can be injected to mix with the consolidation composition in the formation. Because asphaltene is non-soluble in water and other aqueous compositions, increasing the concentration of water relative to the concentration of the solvent causes the asphaltene to precipitate in place within the formation to consolidate the sand. Utilizing this method in the context of sand consolidation enables the asphaltene to precipitate in the presence of the sand in the subsurface formation, thereby consolidating the sand.

The solvent may be an organic solvent. In some embodiments, the solvent may include one or more than one of an alkyl alcohol, an alkyl aromatic, a halogenated hydrocarbon, or combinations of these. The alkyl alcohol may be a straight-chain, branched, or cyclic alkyl alcohol having from 1 to 20 carbon atoms, such as from 1 to 15, from 1 to 12, or from 1 to 10 carbon atoms. The alkyl alcohol may be a saturated alkyl alcohol or an unsaturated alkyl alcohol. The alkyl alcohol may have one or more than one hydroxyl group, such as 1, 2, 3, 4, or more than 4 hydroxyl groups. Examples of alkyl alcohols may include, but are not limited to methanol, ethanol, propanol, isopropanol, butanol, hexanol, heptanol, octanol, or combinations of these. Other organic alcohols may also be suitable for use in the solvent. In some embodiments, the solvent may include a plurality of alkyl alcohols. In some embodiments, the solvent may include from 5 wt. % to 50 wt. % alkyl alcohol based on the total weight of the solvent, such as from 5 wt. % to 45 wt. %, from 5 wt. % to 40 wt. %, from 5 wt. % to 35 wt. %, from 5 wt. % to 30 wt. %, from 5 wt. % to 25 wt. %, from 5 wt. % to 20 wt. %, from 5 wt. % to 17 wt. %, from 10 wt. % to 50 wt. %, from 10 wt. % to 45 wt. %, from 10 wt. % to 40 wt. %, from 10 wt. % to 35 wt. %, or from 10 wt. % to 30 wt. %, from 10 wt. % to 25 wt. %, from 10 wt. % to 20 wt. %, from 10 wt. % to 17 wt. %, from 13 wt. % to 50 wt. %, from 13 wt. % to 45 wt. %, from 13 wt. % to 40 wt. %, from 13 wt. % to 35 wt. %, or from 13 wt. % to 30 wt. %, from 13 wt. % to 25 wt. %, from 13 wt. % to 20 wt. %, from 13 wt. % to 17 wt. %, or approximately 15 wt. % alkyl alcohol based on the total weight of the solvent. In some embodiments, the alkyl alcohol may be methanol.

The alkyl aromatic may include one or a plurality of aromatic rings and one or a plurality of alkyl groups. The alkyl groups may be straight or branched and may be saturated or unsaturated. The alkyl may have from 1 to 20 carbon atoms, such as from 1 to 15, from 1 to 12, or from 1 to 10 carbon atoms. In some embodiments, the solvent may include a plurality of alkyl aromatics. Alkyl aromatics may include, but are not limited to, toluene, ethylbenzene, p-xylene, m-xylene, o-xylene, mesitylene, durene, 2-phenylhexane, hexamethylbenzene, other alkyl aromatics, or combinations of these. In some embodiments, the solvent may include from 5 wt. % to 50 wt. % alkyl aromatic based on the total weight of the solvent, such as from 5 wt. % to 45 wt. %, from 5 wt. % to 40 wt. %, from 5 wt. % to 35 wt. %, from 5 wt. % to 30 wt. %, from 5 wt. % to 25 wt. %, from 5 wt. % to 22 wt. %, from 10 wt. % to 50 wt. %, from 10 wt. % to 45 wt. %, from 10 wt. % to 40 wt. %, from 10 wt. % to 35 wt. %, from 10 wt. % to 30 wt. %, from 10 wt. % to 25 wt. %, from 10 wt. % to 22 wt. %, from 15 wt. % to 50 wt. %, from 15 wt. % to 45 wt. %, from 15 wt. % to 40 wt. %, from 15 wt. % to 35 wt. %, from 15 wt. % to 30 wt. %, from 15 wt. % to 25 wt. %, from 15 wt. % to 22 wt. %, from 18 wt. % to 50 wt. %, from 18 wt. % to 45 wt. %, from 18 wt. % to 40 wt. %, from 18 wt. % to 35 wt. %, from 18 wt. % to 30 wt. %, from 18 wt. % to 25 wt. %, from 18 wt. % to 22 wt. %, or approximately 20 wt. % alkyl aromatic. In some embodiments, the alkyl aromatic may be toluene, xylene, or both. As used in this disclosure, the term "xylene" refers a composition consisting of p-xylene, o-xylene, m-xylene, or any combinations of these. In some embodiments, the solvent may include from 3 wt. % to 25 wt. %, from 3 wt. % to 20 wt. %, from 3 wt. % to 15 wt. %, from 3 wt. % to 12 wt. %, from 5 wt. % to 25 wt. %, from 5 wt. % to 20 wt. %, from 5 wt. % to 15 wt. %, from 5 wt. % to 12 wt. %, from 8 wt. % to 25 wt. %, from 8 wt. % to 20 wt. %, from 8 wt. % to 15 wt. %, from 8 wt. % to 12 wt. %, or approximately 10 wt. % toluene based on the total weight of the solvent. In some embodiments, the solvent may include from 3 wt. % to 25 wt. %, from 3 wt. % to 20 wt. %, from 3 wt. % to 15 wt. %, from 3 wt. % to 12 wt. %, from 5 wt. % to 25 wt. %, from 5 wt. % to 20 wt. %, from 5 wt. % to 15 wt. %, from 5 wt. % to 12 wt. %, from 8 wt. % to 25 wt. %, from 8 wt. % to 20 wt. %, from 8 wt. % to 15 wt. %, from 8 wt. % to 12 wt. %, or approximately 10 wt. % xylene based on the total weight of the solvent.

The halogenated hydrocarbon may be a straight, branched, or cyclic halogenated hydrocarbon having from 1 to 20 carbon atoms and at least one halogen atom covalently bonded to at least one of the carbon atoms. The halogenated hydrocarbon may also be saturated, unsaturated, or aromatic. Halogens include any of the elements in group 17 of the IUPAC periodic table, which includes fluorine (F), chlorine (Cl), bromine (Br), and iodine (I). In some embodiments, the halogenated hydrocarbon may be an alkyl halide. Halogenated hydrocarbons may include, but are not limited to, chloroform, benzotrichloride, bromoform, bromomethane, carbon tetrachloride, chlorobenzene, chlorofluorocarbon, chloromethane, 1,1-dichloro-1-fluoroethane, 1,2-dichlorobenzene, 1,1-dichloroethane, 1,2-dichloroethane, 1,1-dichloroethene, 1,2-dichloroethene, dichloromethane, 1,2-difluorobenzene, 1,2-diiodoethylene, diiodomethane, fc-75, hexachlorobutadiene, hexafluoro-2-propanol, parachlorobenzotrifluoride, perfluoro-1,3-dimethylcyclohexane, perfluorocyclohexane, perfluorodecalin, perfluorohexane, perfluoromethylcyclohexane, perfluoromethyldecalin, perfluorooctane, perfluorotoluene, perfluorotripentylamine, tetrabromomethane, 1,1,1,2-tetrachloroethane, 1,1,2,2-tetrachloroethane, tetrachloroethylene, 1,2,4-trichlorobenzene, 1,1,1-trichloroethane, 1,1,2-trichloroethane, trichloroethylene, 1,2,3-trichloropropane, 1,1,1-trifluoro-2-chloroethane, 2,2,2-trifluoroethanol, trifluorotoluene, trihalomethane, or combinations of these. In some embodiments, the solvent may include from 40 wt. % to 85 wt. % halogenated hydrocarbon based on the total weight of the solvent, such as from 40 wt. % to 80 wt. %, from 40 wt. % to 75 wt. %, from 40 wt. % to 70 wt. %, from 40 wt. % to 67 wt. %, from 45 wt. % to 85 wt. %, from 45 wt. % to 80 wt. %, from 45 wt. % to 75 wt. %, from 45 wt. % to 70 wt. %, from 45 wt. % to 67 wt. %, from 50 wt. % to 85 wt. %, from 50 wt. % to 80 wt. %, from 50 wt. % to 75 wt. %, from 50 wt. % to 70 wt. %, from 50 wt. % to 67 wt. %, from 55 wt. % to 85 wt. %, from 55 wt. % to 80 wt. %, from 55 wt. % to 75 wt. %, from 55 wt. % to 70 wt. %, from 55 wt. % to 67 wt. %, from 60 wt. % to 85 wt. %, from 60 wt. % to 80 wt. %, from 60 wt. % to 75 wt. %, from 60 wt. % to 70 wt. %, from 60 wt. % to 67 wt. %, from 63 wt. % to 85 wt. %, from 63 wt. % to 80 wt. %, from 63 wt. % to 75 wt. %, from 63 wt. % to 70 wt. %, from 63 wt. % to 67 wt. %, or approximately 65 wt. % halogenated hydrocarbon based on the total weight of the solvent. In some embodiments, the halogenated hydrocarbon may be chloroform.

In some embodiments, the solvent may include at least one alkyl alcohol, at least one alkyl aromatic, and at least one halogenated hydrocarbon. In some embodiments, the solvent may consist of or consist essentially of at least one alkyl alcohol, at least one alkyl aromatic, and at least one halogenated hydrocarbon. In some embodiments, the solvent may include at least one of methanol, toluene, xylene, chloroform, or combinations of these. In some embodiments, the solvent may include methanol, toluene, xylene, and chloroform. In some embodiments, the solvent may consist of or consist essentially of methanol, toluene, xylene, and chloroform. For example, in some embodiments, the solvent may include from 5 wt. % to 50 wt. % methanol, from 5 wt. % to 50 wt. % toluene, from 5 wt. % to 50 wt. % xylene, and from 40 wt. % to 85 wt. % chloroform. In some embodiments, the solvent may consist of or consist essentially of from 5 wt. % to 50 wt. % methanol, from 5 wt. % to 50 wt. % toluene, from 5 wt. % to 50 wt. % xylene, and from 40 wt. % to 85 wt. % chloroform. In some embodiments, the solvent may include 15 wt. % methanol, 10 wt. % xylene, 10 wt. % toluene, and 65 wt. % chloroform based on a total weight of the solvent. Asphaltene is soluble in a solvent including methanol, toluene, xylene, and chloroform, and therefore, when the asphaltene and the solvent are combined to form the consolidation composition, the consolidation composition is in a liquid phase.

The consolidation composition may include a weight ratio of solvent to asphaltene that results in the asphaltene dissolving in the solvent to the extent that the consolidation composition is substantially free of dissolved solids prior to introducing the consolidation composition to the subsurface formation. As used in this disclosure, the term "substantially free of dissolved solids" refers to the consolidation composition having less than 1.0 percent by weight undissolved solids. In some embodiments, the consolidation composition may have a weight ratio of solvent to asphaltene of from 5:1 to 20:1. For example, in some embodiments, the consolidation composition may have a weight ratio of solvent to asphaltene of from 5:1 to 18:1, from 5:1 to 15:1, from 5:1 to 12:1, from 7:1 to 20:1, from 7:1 to 18:1, from 7:1 to 15:1, from 7:1 to 12:1. In some embodiments, the consolidation composition may have a weight ratio of solvent to asphaltene of 10:1. In some embodiments, the consolidation composition includes 50 grams (g) asphaltene for every 1000 milliliter (ml) of the solvent.

The consolidation composition may include a weight ratio of solvent to maltene that results in the maltene dissolving in the solvent to the extent that the consolidation composition is substantially free of dissolved solids prior to introducing the consolidation composition to the subsurface formation. As used in this disclosure, the term "substantially free of dissolved solids" refers to the consolidation composition having less than 1.0 percent by weight undissolved solids. In some embodiments, the consolidation composition may have a weight ratio of solvent to maltene that results in the consolidation composition having a viscosity in a range of from 5 to 15 cP (1 cP=1 mPa·s), from 5 to 12 cP, from 5 to 10 cP, from 5 to 7 cP, from 7 to 15 cP, from 7 to 12 cP, from 7 to 10 cP, from 10 to 15 cP, from 10 to 12 cP, or from 12 to 15 cP.

In some embodiments, the consolidation composition may have a weight ratio of solvent to maltene of from 5:1 to 20:1. For example, in some embodiments, the consolidation composition may have a weight ratio of solvent to maltene of from 5:1 to 18:1, from 5:1 to 15:1, from 5:1 to 12:1, from 7:1 to 20:1, from 7:1 to 18:1, from 7:1 to 15:1, from 7:1 to 12:1. In some embodiments, the consolidation composition may have a weight ratio of solvent to maltene of 10:1. In some embodiments, the consolidation composition includes 50 grams (g) maltene for every 1000 milliliter (ml) of the solvent.

The consolidation composition may include a weight ratio of asphaltene to maltene of from 0.5:1 to 2:1. For example, in some embodiments, the consolidation composition may have a weight ratio of asphaltene to maltene of from 0.5:1 to 1.8:1, from 0.5:1 to 1.5:1, from 0.5:1 to 1.2:1, from 0.7:1 to 2:1, from 0.7:1 to 1.8:1, from 0.7:1 to 1.5:1, or from 0.7:1 to 1.2:1. In some embodiments, the consolidation composition may have a weight ratio of asphaltene to maltene of approximately 1:1.

The consolidation composition may have a viscosity that enables the consolidation composition to be injected a farther distance into the formation compared to conventional diversion materials. In some embodiments, the consolidation composition may have a viscosity of from 5 to 15 cP. Not intending to be limited by theory, it is believed that the viscosity of the consolidation composition may enable the consolidation composition to be injected farther into the subsurface formation compared to conventional diversion methods that may result in consolidating sand positioned a farther distance into the subsurface formation as compared to sand consolidated by other conventional sand consolidation materials having greater viscosities.

The consolidation composition may be a stable solution, meaning that the consolidation composition has a stable chemical makeup, in which the asphaltene remains dissolved in solution, at a temperature of up to 400° C. In embodiments, the consolidation composition may be a stable solution, meaning that the consolidation composition has a stable chemical makeup, in which the asphaltene remains dissolved in solution, at a temperature of from 0° C. to 400° C.

In some embodiments, the method may further include preventing precipitation of the asphaltene at an introduction point of the consolidation composition to the subsurface formation. For example, in some embodiments, the method may include introducing a spacer fluid into the formation after introducing the consolidation composition and before introducing the aqueous composition. Introducing the spacer fluid into the formation may include injecting the spacer fluid through an injection well. The spacer fluid may be used to propel the consolidation composition farther into the formation. As used in this disclosure, a spacer fluid refers to a liquid used to physically separate one special-purpose liquid from another. In this case, the spacer fluid maybe used to separate the consolidation composition from the aqueous composition. Using a spacer fluid may ensure that the consolidation composition does not precipitate at the injection point, or introduction point, of the injection well. Special-purpose liquids are typically prone to contamination, so a spacer fluid compatible with each is used between the two. Therefore, the spacer fluid would be compatible with both the consolidation composition and the aqueous composition. The spacer fluid may be an oil-based fluid, however various spacer fluids are contemplated based on the specific industrial application. Parameters governing the effectiveness of a spacer include flow rate, contact time, and fluid properties.

Once the consolidation composition is positioned within the subsurface formation, the method may include introducing the aqueous composition into the subsurface formation to precipitate the asphaltene out of the consolidation composition in the subsurface formation to consolidate the sand present in the subsurface formation. Introducing the aqueous composition into the formation may include injecting the aqueous composition through the injection well. In some embodiments, the aqueous composition may include one or more than one of fresh water, salt water, brine, municipal water, formation water, produced water, well water, filtered water, distilled water, sea water, other type of water, or combinations of waters. In some embodiments, the aqueous composition may include water or a solution containing water and one or more inorganic compounds dissolved in the water or otherwise completely miscible with the water. In some embodiments, the aqueous composition may contain brine, including natural and synthetic brine. Brine includes water and a salt that may include calcium chloride, calcium bromide, sodium chloride, sodium bromide, other salts, and combinations of these.

After consolidating the sand in the subsurface formation, the method may include producing hydrocarbons from the subsurface formation. The subsurface formation may have a permeability directly related to the maltene channeling previously described. Specifically, because the maltene is soluble in both the solvent and the aqueous composition, the maltene continued to flow in liquid form when the aqueous composition was introduced into the subsurface formation, thereby forming channels within the consolidated sand and improving permeability. In embodiments, the permeability of the subsurface formation may be from 25 to 150 mD (milliDarcies), from 25 to 100 mD, from 25 to 80 mD, from 25 to 70 mD, from 25 to 60 mD, from 25 to 50 mD, from 40 to 150 mD, from 40 to 100 mD, from 40 to 80 mD, from 40 to 70 mD, from 40 to 60 mD, from 40 to 50 mD, from 45 to 150 mD, from 45 to 100 mD, from 45 to 80 mD, from 45 to 70 mD, from 45 to 60 mD, from 45 to 50 mD, from 50 to 150 mD, from 50 to 100 mD, from 50 to 80 mD, from 50 to 70 mD, from 50 to 60 mD, from 65 to 150 mD, from 65 to 100 mD, from 65 to 80 mD, or from 65 to 70 mD.

EXAMPLES

The following examples illustrate features of the present disclosure but are not intended to limit the scope of the disclosure.

Example 1

Example 1 demonstrates the stability of the consolidation composition at high temperature. In this experiment, 50 ml of solvent was mixed with sand and 10 grams of asphaltene and 10 grams of maltene to form the consolidation composition. The solvent included 15 wt. % methanol, 10 wt. % xylene, 10 wt. % toluene, and 65 wt. % chloroform. The consolidation composition was then placed in an oven at 300° C. 24 hours. The mixture was then observed to be stable after.

Example 2

To investigate how the asphaltene precipitate functions as sand consolidator and how the maltene functions as a channeler (i.e., permeability improver), the consolidation composition was injected into a core sample and flooded with water. A Coretest system model RPS-812-Z was used in this experiment. The consolidation composition had a weight ratio of solvent to asphaltene of 10:1. The consolidation composition had a weight ratio of solvent to maltene of 10:1. The consolidation composition had a weight ratio of asphaltene to maltene of 1:1. The solvent included 15% methanol, 10% xylene, 10% toluene, and 65% chloroform. A sample of unconsolidated sand was selected to load into the Coretest system, having a length of 2.11 inches and a diameter of 1.51 inches. The core plug sample was placed in the Coretest system and injected with the consolidation composition at 120° C., 500 psi back pressure, and 1000 psi confined pressure. Confined pressure is the pressure under which the core plug sample is confined. The core plug sample was then injected with water at three different rates to flood the pores, 0.5 milliliter per minute (ml/min), 1 ml/min, and 2 ml/min. In each experiment, the unconsolidated sand sample became a solid core sample with no blockage between the pores of sand grains and no back pressure at any flow rate (i.e. even at a flow rate as great as 2 ml/min). This means that the asphaltene precipitated and consolidated the sand, and the maltene continued to flow, forming channels within the consolidated sand, such that permeability improved. The permeability of the consolidated sand sample for each flow rate is shown in the table below. The average permeability of the consolidated sand sample was 60.87 mD.

TABLE 1

Permeability of the consolidated sand sample for each flow rate

| Flow rate (ml/min) | Inlet pressure (psi) | Permeability (mD) |
|---|---|---|
| 0.5 | 1.2 | 47.76 |
| 1 | 1.7 | 67.42 |
| 2 | 3.4 | 67.42 |

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method for consolidating sand in a subsurface formation, the method comprising:
   introducing a consolidation composition into the subsurface formation, the consolidation composition comprising asphaltene and maltene dissolved in a solvent, in which the consolidation composition has a weight ratio of asphaltene to maltene from 0.5:1 to 2:1; and
   after introducing the consolidation composition, introducing an aqueous composition to the subsurface formation in order to precipitate the asphaltene in the subsurface formation, where the precipitated asphaltene consolidates sand within the subsurface formation and the maltene forms channels throughout the subsurface formation, thereby producing a permeability of the subsurface formation from 45 to 70 mD.

2. The method of claim 1, in which the consolidation composition has a viscosity of from 5 to 15 cP.

3. The method of claim 1, in which the consolidation composition has a weight ratio of solvent to asphaltene from 5:1 to 20:1.

4. The method of claim 1, in which the consolidation composition has a weight ratio of solvent to maltene from 5:1 to 20:1.

5. The method of claim 1, in which the maltene dissolved in the solvent has a viscosity from 5 to 10 cP.

6. The method of claim 1, in which an inlet pressure of the consolidation composition during introduction of the consolidation composition to the subsurface formation is from 2000 to 4000 pounds per square inch (psi).

7. The method of claim 1, which the solvent includes an alkyl alcohol, an alkyl aromatic, a halogenated hydrocarbon, or combinations of these.

8. The method of claim 1, in which the solvent includes methanol, toluene, xylene, and chloroform.

9. The method of claim 1, in which the solvent includes:
5 to 50 wt. % methanol;
5 to 50 wt. % xylene;
5 to 50 wt. % toluene; and
40 to 85 wt. % chloroform based on a total weight of the solvent.

10. The method of claim 1, in which the aqueous composition includes at least one of fresh water, salt water, brine, municipal water, formation water, produced water, well water, filtered water, distilled water, sea water, other type of water, or combinations of these.

11. The method of claim 1, in which the consolidation composition is substantially free of undissolved solids prior to introducing the consolidation composition to the subsurface formation.

12. The method of claim 1, in which the consolidation composition is a stable solution at a temperature of up to 400° C.

13. The method of claim 1, further comprising injecting a spacer fluid after introducing the consolidation composition and before introducing the aqueous composition.

14. The method of claim 1, further comprising preventing precipitation of the asphaltene at an introduction point of the consolidation composition to the subsurface formation.

15. The method of claim 1, in which introducing the consolidation composition to the subsurface formation includes injecting the consolidation composition from an injection well into the subsurface formation.

16. The method of claim 1, comprising introducing the consolidation composition to the subsurface formation using coiled tubing or a drill string.

17. The method of claim 1, further comprising producing hydrocarbons from the subsurface formation at a rate of from 2000 to 5000 barrels per day.

18. The method of claim 1, in which:
the consolidation composition has a viscosity of from 5 to 15 cP;
the consolidation composition has a weight ratio of solvent to asphaltene from 5:1 to 20:1; and
the consolidation composition has a weight ratio of solvent to maltene from 5:1 to 20:1.

* * * * *